/ Patented Mar. 6, 1962

3,024,089
PROCESS FOR PRODUCING HIGH SURFACE
AREA METAL OXIDES
Walter B. Spencer, Newton Highlands, Walter R. Smith, Harvard, and Alfred F. Cosman, Everett, Mass., assignors to Cabot Corporation, Boston, Mass., a corporation of Delaware
No Drawing. Filed May 10, 1957, Ser. No. 658,229
9 Claims. (Cl. 23—182)

This invention relates to the production of super finely-divided metallic oxides and includes within its scope the novel product comprising metal oxides having surface areas generally in the neighborhood of 1000 sq. meters per gram and being composed of particles about 25–50 Angstrom units in size. Such metal oxides have outstanding utility as reinforcing agents for elastomeric compounds, thickening agents for fluids, gas and vapor adsorbents and catalysts and catalyst supports.

Industry has consistently sought pigments of ever-increasing fineness and surface area. At the time of this invention metal oxides were available as pigments having particles as small as 100 A. and surface areas as great as 300 sq. m./g. Also metal oxide gels having surface areas as high as 800 sq. m./g. are known but such are not finely particulate. Even the finest of carbon blacks are lower in surface area and larger in particle size than the metal oxides of this invention.

It is the principal object of this invention to provide a novel process for the production of novel metal oxides of extraordinary fineness and high surface areas.

It is a further object to provide such a process in which the oxide is obtained by hydrolyzing a compound containing the corresponding metal while in contact with a finely-divided carbonaceous carrier on which the oxide is deposited and then separating the oxide from the carbon.

The objects of this invention are accomplished by depositing or adsorbing the hydrolyzable metallic compound on finely-divided carbon black. The metallic compound is then hydrolyzed on the surface of the carbon black and is converted to the solid state as hydroxide, siloxane or even oxide in the form of particles many times smaller than the particles of black on which they deposit. Thereafter the carbon black is eliminated by oxidation, steaming or hydrogenation at elevated temperature and the hydroxide is converted to the oxide. The hydrolysis step can be carried out at atmospheric temperature but preferably will be carried out at elevated temperatures to accelerate the reaction rate. It may also be carried out in a flame produced by burning a gas which produces water as a combustion product such as hydrogen or a hydrocarbon gas.

As raw material for the process any hydrolyzable metal compound can be used such as silicon tetrachloride, titanium tetrachloride, aluminum chloride, ferric chloride, ethyl orthosilicate, aluminum ethoxide, a chlorosilane, and the like. Whatever the compound, it must be one which will react with the water while adsorbed on the carbon black surface so as to leave the solid reaction product deposited on the surface of the black in the form of small nuclei. Thus, said hydrolizable compound must be susceptible to hydrolysis under conditions sufficiently mild that the carbon black will not be consumed by reaction thereof with water. Unexpectedly, no matter how much excess of metal salt is employed, the nuclei deposited on the carbon particles do not grow in size as is the case in prior processes in which no solid carrier is employed. Furthermore, each particle formed by hydrolysis remains discrete and is readily separable from the other particles after the carbon carrier is removed.

From the unexpected results achieved by the practice of this invention we postulate that the metal salt or compound deposits from the liquid or gaseous phase on the carbon black particles in a monomolecular layer which reacts only on the surface of the carbon with the available water. Because of the adsorptiveness of the carbon black particles the salt molecules are held firmly in place thereon and cannot migrate to other neighboring molecules to cause particle growth as occurs in vapor phase reactions. By the same token, even though the water for hydrolysis comes from a source exterior to the carbon black the salt molecules will continue to adhere to the carbon particles and hence cannot become agglomerated during conversion to the oxide state.

Various embodiments of the process described above are productive to the same overall results. In one embodiment, water is adsorbed from the vapor state onto the carbon black. Vapors of the selected metal compound are then flowed over the black where it becomes adsorbed and reacts with the water present. Thereafter the carbon with surface deposited metal hydroxide or siloxane is oxidized at elevated temperature which completes conversion of the hydroxide or siloxane to the metal oxide and gasifies the carbon.

In another embodiment, the metal compound is deposited from solution onto the surface of the carbon black particles. Water vapor is then flowed over the treated black and hydrolyzes the compound in situ with the same result as described above. Oxidation at elevated temperature completes conversion and eliminates the carbon.

In still another embodiment, carbon black having the metal salt or compound adsorbed thereon is passed through a flame produced by burning a gas which produces water as a combustion product into a heat insulated chamber. Hydrolysis occurs in the hot combustion products. Air or oxygen is introduced into the chamber downstream from the hydrolysis reaction zone to burn away the carbon and convert the hydroxide to the oxide. The solid product can then be recovered from the gases in filters or other known separation apparatus.

The following examples are illustrative of the process of this invention:

*Example 1*

200 g. of Black Pearls 74 (pelletized channel carbon black having a surface area of 131 sq. m./g. and an average particle diameter of 250 A.) was placed in an 80% relative humidity bath at 25° C. for 24 hours, after which it had adsorbed 5% by weight $H_2O$. It was then placed in a closed flask, and a stream of dry $N_2$ saturated with dimethyldichlorosilane vapor was passed through the bed at 25–30° C., causing the following hydrolysis reaction on the surface of the black:

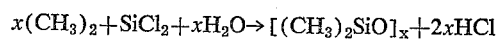

$$x(CH_3)_2+SiCl_2+xH_2O \rightarrow [(CH_3)_2SiO]_x+2xHCl$$

This hydrolysis reaction to produce a siloxane polymer on the black surface generated enough heat to raise the bed temperature to 60° C. Silane was introduced in this manner until enough had been passed through to react stoichiometrically with all of the adsorbed water.

The treated black was evacuated and then heated to 150° C. overnight to remove unreacted $H_2O$, silane, and HCl. The siloxane coating amounted to 5.8% by weight of black.

The dried, treated black was then placed in a crucible and raised to 500° C. in a static air atmosphere in a muffle furnace. After 16 hours at this temperature, the carbon black had been completely removed by oxidation, and the siloxane had been converted to $SiO_2$ by oxidation of methyl groups.

The resulting silica, amounting to 4% of the original black by weight, was white, opalescent, and in the form of small spheres about 1 mm. in diameter, similar to those of the pelleted Black Pearls 74 on which it was formed. These pellets broke up easily between the fingers to a soft powder, indicating small ultimate particle size.

The B.E.T. $N_2$ surface area of this silica was 1094 m.$^2$/g., indicating an ultimate particle size of about 25 A. spheres by calculation. Electron micrographs showed the silica to be easily dispersible in water to ultimate particles 25–50 A. in size, and chains of particles extending to 200,000 A. length. In this respect, the silica formed is similar to carbon black, and other fine silicas. However, its ultimate particle size is smaller, and its surface area higher, than any previously known silica.

*Example 2*

200 g. Monarch 74 carbon black (similar to Black Pearls 74 but not pelleted) was treated with water vapor and dimethyldichlorosilane in a manner similar to Example 1.

After burning away the carbon black, 3.4% by weight of fine silica remained, agglomerated in 2–3 mm. irregular particles. This silica had a B.E.T. surface area of 1070 m.$^2$/g., and broke up very easily to give 25–50 A. chained particles on E.M. examination.

*Example 3*

200 g. of Spheron 6 (pelletized EPC carbon black having a surface area of 106 sq. m./g. and an average particle diameter of 306 A.) was conditioned with moisture and treated with vapors of dimethyldichlorosilane as in Example 1.

After burning away the black, 4.2% fine silica in form of pelleted spheres remained. Its B.E.T. surface area was 980 m.$^2$/g.

*Example 4*

200 g. of Spheron 6 carbon black was conditioned with moisture as in Example 1. It was placed in a closed flask with side arms containing $H_2O$ and $SiCl_4$ (liquid, B.P. 57° C.), and the whole assembly was placed in an oven.

Water vapor in the free space was pumped off and $SiCl_4$ vapor admitted at 28° C. The assembly was then heated to 60° C. to obtain a higher vapor pressure of $SiCl_4$. The reaction was allowed to proceed for 2 hours, during which time the free vapor containing HCl was pumped off, and more $SiCl_4$ admitted.

The treated black was dried and ashed as previously, to remove the carbon and left 4.5% by weight $SiO_2$ by the overall reaction:

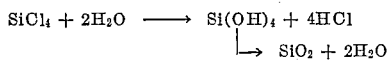

$$SiCl_4 + 2H_2O \longrightarrow Si(OH)_4 + 4HCl$$
$$\longrightarrow SiO_2 + 2H_2O$$

This silica was in the form of spheres similar to the Spheron 6 pellets. The B.E.T. surface area was 631 m.$^2$/g.

*Example 5*

Abount 200 g. of Black Pearls 74 was conditioned with moisture as in Example 1.

It was placed in a glass rotary aftertreating apparatus consisting of a long tube with stirring paddles inside to insure constant and thorough agitation of the black. Dry $N_2$, saturated with dimethyldichlorosilane at room temperature, was directed through the aftertreater, with agitation of the black. Reaction was rapid, a warm zone passing down the tube to indicate the reacting area, and was complete in 30 minutes.

After drying and ashing away the black, the resulting silica amounted to 10.6% by wt. of black, and had a B.E.T. surface area of 1180 m.$^2$/g.

tI will be appreciated that the formulae set forth in the preceding examples are theoretical characterizations of the hydrolysis reaction taking place on the surface of the carbon black. It is presumed that at the low reaction temperatures employed the metal salt or compound converts only to the hydroxide or siloxane form. It is conceivable, however, that some and even all of the metal may actually react all of the way to the oxide from the hydrolysis and prior to the subsequent high temperature oxidation step. Certainly this may be the case if the hydrolysis is carried out at temperatures above 100° C. Consequently, in the characterization of the hydrolysis results as a conversion to the hydroxide or siloxane it must be assumed that conversion to oxide may also occur immediately thereafter.

It should also be noted that for the purposes of this invention silica is considered to be a metal oxide, since silicon behaves like and is representative of a typical metal in this respect.

While it has been stated that the product of this invention is generally of surface area greater than 1000 sq. m./g. it is obvious that the process of the invention can be productive of lower surface area material. Naturally, however, the preferred product is that of the greatest surface area.

Having thus described our invention, we claim:

1. A process for producing very finely divided metal oxides which are stable at the combustion temperature of carbon black which comprises: contacting carbon black with vapors of a compound of said metal, said compound being characterized by its tendency to hydrolyze under conditions milder than required for appreciable reaction of carbon black with water, thereby effecting adsorption of said compound on said black; contacting said compound while it is adsorbed on said carbon black with water under controlled conditions suitable for effecting active hydrolysis of said compound, all of said water being in vapor form except that already adsorbed upon the carbon black prior to contacting said black with said compound; heating said carbon black with the product of said hydrolysis reaction thereon in an oxidizing atmosphere until said carbon black has been consumed and said hydrolysis product is in the oxide form; and recovering the finely divided metal oxide remaining.

2. The process of claim 1 in which said compound of said metal is an inorganic salt.

3. The process of claim 2 in which said inorganic salt is a halide.

4. The process of claim 1 in which the said compound of said metal is organic.

5. The process of claim 1 in which the water with which said compound is contacted consists largely of water vapor.

6. The process of claim 1 in which the said compound of said metal is chosen from the group consisting of silicon tetrachloride, titanium tetrachloride, aluminum chloride, ferric chloride, ethyl orthosilicate, aluminum ethoxide and chlorosilane.

7. A process for producing very finely divided metal oxides which are stable at the combustion temperature of carbon black comprising: contacting dry carbon black with a liquid comprising a compound of said metal which is characterized by its tendency to hydrolyze under conditions milder than required for appreciable reaction of carbon black with water, thereby effecting adsorption of said compound on said black; contacting said compound while it is adsorbed on said carbon black with water vapor under controlled conditions suitable for effecting active hydrolysis of said compound; heating said carbon black with the product of said hydrolysis reaction thereon in an oxidizing atmosphere until said carbon black has been consumed and said hydrolysis product is in the oxide form; and recovering the finely divided metal oxide remaining.

8. A process for producing metal oxides of extreme fineness which comprises contacting carbon black in the absence of moisture with vapors of a hydrolyzable metal compound selected from the group consisting of silicon tetrachloride, titanium tetrachloride, aluminum chloride, ferric chloride, ethyl orthosilicate, aluminum ethoxide, and chlorosilane, thereby adsorbing a layer of said compound on said carbon black, contacting said carbon black having said compound adsorbed thereon with water vapor under conditions at which said compound undergoes active hydrolysis, heating in an oxidizing atmosphere the resultant carbon black having the product of hydrolysis of said compound thereon until the carbon black has been consumed, and recovering said product as the oxide of said metal.

9. A process for producing metal oxides of extreme fineness which comprises contacting carbon black with water vapor thereby adsorbing a layer of water on said carbon black, contacting said carbon black having said water adsorbed thereon with vapors of a hydrolyzable metal compound selected from the group consisting of silicon tetrachloride, titanium tetrachloride, aluminum chloride, ferric chloride, ethyl orthosilicate, aluminum ethoxide and chlorosilane under conditions at which said compound undergoes active hydrolysis, heating in an oxidizing atmosphere the resultant carbon black having the product of hydrolysis thereon until the carbon black has been consumed, and recovering said product as the oxide of said metal.

References Cited in the file of this patent

UNITED STATES PATENTS

| | | |
|---|---|---|
| 629,268 | O'Sullivan | July 18, 1899 |
| 2,268,589 | Heany | Jan. 6, 1942 |
| 2,399,687 | McNabb | May 7, 1946 |
| 2,520,651 | Oswald | Aug. 29, 1950 |
| 2,765,242 | Alexander | Oct. 2, 1950 |

FOREIGN PATENTS

| | | |
|---|---|---|
| 267,788 | Great Britain | Mar. 24, 1927 |